United States Patent [19]

Bates et al.

[11] Patent Number: 5,239,577
[45] Date of Patent: Aug. 24, 1993

[54] NETWORK AND METHOD FOR PROVIDING CROSS-MEDIA CONNECTIONS

[75] Inventors: Peter C. Bates, Morristown; Jamie M. Eisman, Fair Lawn; Gita Gopal, Wayne; Neil A. Ostroff, Red Bank; Fu-lin Wu, East Brunswick, all of N.J.

[73] Assignee: Bell Communications Research, Inc., Livingston, N.J.

[21] Appl. No.: 621,607

[22] Filed: Dec. 3, 1990

[51] Int. Cl.$^5$ .............................................. H04M 1/66
[52] U.S. Cl. ................................... 379/201; 379/211; 379/212; 379/213; 379/196
[58] Field of Search ............... 379/210, 211, 212, 213, 379/214, 97, 201, 202

[56] References Cited

U.S. PATENT DOCUMENTS

| | | | |
|---|---|---|---|
| 4,313,035 | 1/1982 | Jordan et al. | 379/211 |
| 4,878,239 | 10/1989 | Solomon et al. | 379/196 |
| 4,954,958 | 9/1990 | Savage et al. | 379/97 |
| 5,058,152 | 10/1991 | Solomon et al. | 379/196 |

OTHER PUBLICATIONS

"Information Processing Systems: Open Systems Interconnection—The Directory—Overview of Concepts, Models and Services," ISO, Draft Int'l Standard ISO 9594-1:1988.

"Designing a Global Name Service," B. Lampson, Proceedings of Fifth Symposium on the Principles of Distributed Computing, Aug. 1986.

"The Clearinghouse: A Decentralized Agent for Locating Named Objects in a Distributed Environment," D. Oppen and Y. Dalal, ACM Transactions on Office Information System, vol. 1, No. 3, Jul. 1983.

"The Profile Naming Service" L. L. Peterson, ACM Transactions on Computer Systems, vol. 6, No. 4, Nov. 1988.

*Primary Examiner*—James L. Dwyer
*Assistant Examiner*—Fan Tsang
*Attorney, Agent, or Firm*—Leonard Charles Suchyta; James W. Falk

[57] ABSTRACT

A network (10) for providing cross-context connections between subscribers comprises a plurality of directory databases for storing mappings between individual names, addresses and personal identification numbers of network subscribers in a plurality of telecommunications contexts such as business, residence, cellular, etc. The network (10) also comprises a linking database comprising one entry for each subscriber. Each entry of the linking database is accessed by the personal identification number of a subscriber and contains pointers to particular ones of the directory databases where the addresses for the subscriber in different contexts can be found. For example, to set up a cross-context connection, a first subscriber (A) who knows the address of a second subscriber (B) in one context, transmits the known address to a directory controller (70). The directory controller (70) utilizes the known address as a source address and accesses a directory database to find out the personal identification number of the second subscriber. The personal identification number is then utilized by the directory controller (70) to access the linking database to determine the directory database which contains the address of the second subscriber in a desired context. The address of the second subscriber in the desired context is obtained and a connection is established between the first subscriber and the second address of the second subscriber.

20 Claims, 2 Drawing Sheets

FIG. 2

| UNIQUE ID=123456789 | | | |
|---|---|---|---|
| TARGET CONTEXT | TARGET VALUE | PROVIDER ADDRESS | KEY INFORMATION |
| RESIDENCE NUMBER | TELEPHONE NUMBER | DIRECTORY ASSISTANCE | |
| RESIDENCE FAX | | FAX PROVIDER | |
| RESIDENCE EMAIL | EMAIL ADDRESS | | |
| CELLULAR NUMBER | | CELLULAR PROVIDER | CUSTOMER ID |
| BUSINESS NAME | | CORPORATE PROVIDER | |
| BUSINESS NUMBER | | CORPORATE PROVIDER | |
| BUSINESS FAX | | CORPORATE PROVIDER | |
| BUSINESS EMAIL | | CORPORATE PROVIDER | |
| BUSINESS VMAIL | | CORPORATE PROVIDER | |

NETWORK AND METHOD FOR PROVIDING CROSS-MEDIA CONNECTIONS

FIELD OF THE INVENTION

The rapid proliferation of the use of multiple media for interpersonal communications has led to the situation where many different addresses are associated with a person in a variety of different contexts, for example, cellular telephone, residence telephone, business telephone, fax and electronic mail. The present invention relates to a telecommunications network and connection routing method which enables a first subscriber who knows the address of a second subscriber in one context to establish a connection with the second subscriber in a second context in which the first subscriber does not know the address of the second subscriber.

BACKGROUND OF THE INVENTION

Table 1 provides examples of many addresses such as fax number, cellular telephone number, residence phone number, and electronic mail address which may be associated with a person.

TABLE 1

| Address | Context |
|---|---|
| 201-835-9944 | residence number |
| 201-829-4416 | business number |
| 984-5837 | fax number |
| 764-4356 | cellular number |
| 829-6001 | business voice-mail number |
| thumper!jdoe | electronic mail address |

Table 2 lists some contexts in which information is stored about a person (e.g. business and residence), along with names appropriate for the contexts.

TABLE 2

| Name | Context |
|---|---|
| John Doe, Speedwell Ave, Morristown, NJ | residential |
| John Doe, Bellcore, Applied Research | business |
| John Doe, Bellcore, Applied Research, 2145 | business fax |

Contexts are derived by partitioning the total name space into logically related portions, for example, by mode of communication. A name, as used herein, is a set of attributes for disambiguating a person in a particular context. For example, in the residential context, to disambiguate a person, the name may include the family name, given name, and residence address. A name in one context is usually not sufficient to uniquely identify a person in another context.

An address gives a physical location for a person in a network. In some contexts, databases exist to map from a name to an address. An example of such a database is a directory assistance database which is maintained by a public switched telephone company for mapping names to residential telephone numbers.

Generally, to establish a connection in a network such as the public switched telephone network, a subscriber must have either an address appropriate for the context of the connection, or a name that forms a key to search a database in the particular context, so that the desired address can be obtained. Thus, the above-described naming model currently in use in the telecommunications environment is quite rigid and does not help in cases where a name or address is known in one context but not in the desired target context. For example, a fully disambiguated name in a residential context is of no use in trying to find a person's business fax number.

With the proliferation of names and addresses, a telephone network architecture and connection routing method which can provide cross-media and cross-context name and address translation and connection routing is highly desirable. Examples of services which could be provided by cross-media and cross-context name and address translation and connection routing include: 1. calling a person's business phone by only specifying the residence number; 2. calling a person's cellular phone by only specifying the business number, and 3. sending an electronic document addressed by residence phone number by electronic mail.

To establish such services, a telecommunications network should include a database structure for performing name-to-address and address-to-address mappings. One possible way to establish such services is to create a set of service specific databases. However, this approach is quite cumbersome and does not easily allow deployment of unanticipated new services. Rather, it is desirable to provide a telecommunications network architecture including a unified database infrastructure for providing cross-media and cross-context services including new unanticipated services.

Another way for establishing cross-media and cross-context connections in a telecommunications network is to maintain a single super-database which contains all of the names and addresses of each subscriber. However, this approach is not technically or administratively practical. For privacy and administrative reasons it is not possible to collect all the names and addresses of a person in one place. For example, many businesses maintain their own mappings from name to phone, fax, and electronic mail numbers and are unwilling to release the information and propagate all changes to an external database. Similarly, cellular service providers and electronic mail providers may not want to give up information on the name-to-address mappings of their subscribers.

Another possibility for providing a telecommunications network and connection routing method for establishing cross-media and cross-context connections is to utilize a linking database. A linking database includes one entry per person and each entry comprises pointers to other databases which include more comprehensive information about the person. Thus, the linking database does not attempt to collect together comprehensive information about a person, but instead is a directory of directories.

Previous research has been directed to locating directory entries in distributed database systems. (See, ISO, "Information processing systems: open systems interconnection—the directory—overview of concepts, models and service," Draft Int'l Standard ISO 9594-1:1988; B. Lampson, "Designing a global name service," Proceedings of Fifth Symposium on the Principles of Distributed Computing, August 1986; D. Oppen and Y. Dalal, "The Clearinghouse: a decentralized agent for locating named objects in a distributed environment," ACM Transactions on Office Information Systems, Vol. 1, No. 3, July 1983; L. L. Peterson, "The Profile Naming Service," ACM Transactions on Computer Systems, Vol. 6, No. 4, November 1988.) However, none of these prior art studies have provided a satisfactory solution for linking together distributed entries for persons in multiple contexts to achieve cross-media and cross-context connections in a telecommunications network.

Accordingly, it is an object of the present invention to provide a telecommunications network architecture and connection routing method for establishing cross-media and cross-context connections.

SUMMARY OF THE INVENTION

The present invention relates to a telecommunications network architecture and connection routing method for providing cross-context and cross-media connections.

Attached to the network are a plurality of processing systems for maintaining directory databases. These directory databases include mappings between subscriber names and addresses in particular contexts. The directory databases include for example directory assistance databases which provide mappings between residence names and residence addresses (i.e. residence phone numbers), corporate directory databases which provide mappings between names and business addresses (i.e. business phone numbers), cellular provider directory databases which provide mappings between the names of cellular subscribers and cellular addresses; and the Line Identification Database (identified herein as "LDB") which runs at service control points maintained by the Regional Bell Operating Companies. While the LDB database performs many functions, one function of importance herein is that the LDB database provides a mapping between addresses (i.e. phone numbers) and the subscribers to which the phone numbers are assigned.

While all of the above-mentioned directory databases are currently maintained by the various network providers and users, to provide cross-context connections in accordance with the present invention, these directory databases are upgraded to include a personal identification number for each subscriber. In particular, in accordance with an illustrative embodiment of the present invention, the LDB database includes the names of individual subscribers and their personal identification numbers as well as addresses to corporate directory databases.

The network also includes a processing system for maintaining a linking database. The linking database includes one entry per subscriber and this entry is accessible using the personal identification number of the subscriber. Each entry includes pointers to the particular ones of the directory databases which include the addresses of the subscriber in particular contexts. Thus, the linking database does not attempt to collect together all information about a subscriber, rather, it is a directory of directory databases.

To understand how the linking database is utilized to establish a cross-context connection, consider the following example. Illustratively, a first subscriber wishes to reach a second subscriber at a business phone, but the first subscriber only knows the residence phone number of the second subscriber. To make a connection with the business phone of the second subscriber, the first subscriber is connected by the network to a directory controller which illustratively comprises a host computer attached to the network. The first subscriber transmits to the directory controller, the source address (i.e. the residence phone number) of the second subscriber. The directory controller then accesses the LDB database which maps addresses (i.e. phone numbers) to the names of the parties to which the addresses are assigned and personal identification numbers. Thus, in response to the query providing the source address, the directory controller obtains the personal identification number of the second subscriber from the LDB database. The directory controller then utilizes the personal identification number to access the linking database and finds for the business phone context a pointer to a particular corporate directory database. The directory controller then accesses the particular corporate directory utilizing the personal identification number of the second subscriber or other information from the linking database as a key and obtains the business phone address of the second subscriber. The network then automatically connects the first subscriber to the business phone address of the second subscriber to establish the desired connection. Optionally, the business phone address of the second subscriber is transmitted to the first subscriber.

Use of a telecommunications network architecture including a linking database has several important advantages. These are:

1. Security—each directory database can provide its own access restrictions;

2. Privacy—the directory controller can complete a call without revealing addressing information;

3. Ownership of data—data is distributed among the organizations that control the data and all the data about various subscribers is not concentrated in a single location; and 4. Controlled data redundancy—the unique personal identification of a subscriber serves as a link among many databases, thereby eliminating or reducing the need to store the same data in many databases.

Thus, the inventive network architecture including use of a linking database provides a highly advantageous system for completing cross-context and cross-media calls.

BRIEF DESCRIPTION OF THE DRAWING

FIG. 2 illustrates an entry in a linking database for providing cross-context connections in the telecommunications network of FIG. 1.

DETAILED DESCRIPTION OF THE INVENTION

Figure 1:
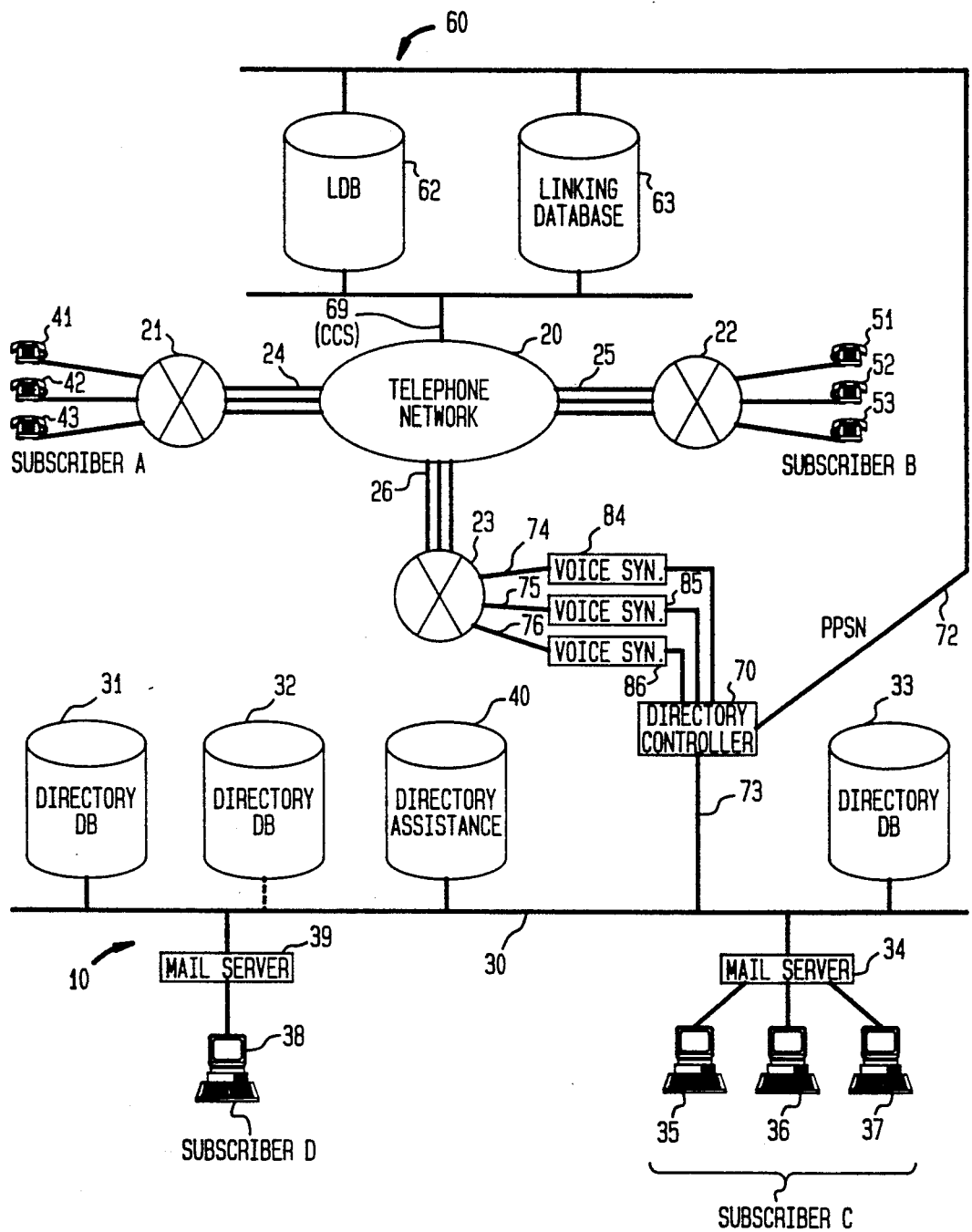
FIG. 1 illustrates a telecommunications network for providing cross-context connections in accordance with an illustrative embodiment of the present invention.

FIG. 1 schematically illustrates a telecommunication network 10 for providing cross-context connections. The network 10 is formed in part by the public switched telephone network 20 and in part by an alternative public or private data network 30 which links a plurality of remotely located processor or memory systems 31, 32, 33, and 40. The network 30 may be accessed by a variety of user devices located at various remote locations. For example, the network 30 may be accessed by the mail servers 34 and 39. Illustratively, the computer terminals 35, 36, 37 are in communication with the mail server 34 and the terminal 38 is in communication with the mail server 39. Thus, as used herein, the term connection includes switched connections which are set up in the public switched telephone network as well as other communication paths which are established between subscribers.

The processor systems 31, 32, and 33 each maintain one or more directory databases which are maintained by various private parties such as corporations. The directory databases typically include mappings between persons and their addresses in the various business contexts such as business phone numbers, business fax numbers, and cellular numbers. The directory databases also include personal identification numbers for the persons contained in these databases. Processor system 40 maintains a directory assistance database. The directory assistance database includes mappings between residence names and addresses (i.e. residential phone numbers). In accordance with the present invention, the directory assistance database also includes the personal identification number of the persons listed therein.

As shown in FIG. 1, the public telephone network 20 comprises a plurality of central offices, such as the offices 21, 22 and 23. These central offices are illustratively interconnected by the trunk lines 24, 25, and 26.

Numerous units of customer premises equipment are connected to the public switched telephone network 20. These units of customer premises equipment include for example telephones, fax machines, and computer terminals. For example, attached to the central office 21 are three units of customer premises equipment belonging to subscriber A. These units are a residence telephone 41, a business telephone 42, and a business fax 43. Similarly, three units of customer premises equipment belonging to subscriber B are in communication with the central office 22. These units ar the residence telephone 51, the business telephone 52 and a cellular phone 53.

Also attached to the telephone network 20 is the service control point 60. The service control point 60 is a multiprocessor system which is schematically shown in FIG. 1 as comprising the interconnected processors 62 and 63. The service control point 60 may be accessed from the telephone network via the common channel signalling (CCS) network 69. Typically, there are one or two service control points belonging to each of the Regional Bell Operating Companies.

The service control points, such as the service control point 60 shown in FIG. 1, perform a variety of functions for the public switched telephone network including maintaining a variety of databases. For example, the processor 62 maintains the LDB database. The LDB database includes mappings between telephone line numbers and the subscribers to whom these numbers are assigned. In accordance with the present invention, the LDB database includes names and personal identification numbers as well as addresses to corporate directory databases of the persons listed therein.

The service control point 60 also includes the linking database. The linking database is shown in FIG. 1 as being maintained by the processor 63. In particular embodiments of the invention, however, the same processing units which maintain the LDB or directory assistance databases may also maintain the linking database. The structure of the linking database and its role in establishing cross-context connections are described in detail below.

A directory controller 70 is also included in the network 10 of FIG. 1. The directory controller 70 comprises a general purposes host computer. The directory controller 70 communicates with the service control point 60 via the schematically illustrated connection 72 which, for example, represents the Public Packet Switched Network (PPSN). The directory controller 70 is also connected to the network 30 via the schematically illustrated connection 73.

Attached to the central office 23 of FIG. 1 is a hunt group of lines 74, 75, 76. The lines 74, 75, and 76 terminate on the voice synthesizers 84, 85, and 86 respectively. The voice synthesizers 84, 85, and 86 are connected to the directory controller 70 and enable the directory controller to communicate with individual telephone subscribers using synthesized voice and touch-tone detection. The voice synthesizers also enable the directory controller to communicate with the public switched telephone network 20 using touch-tone flash-hook-generation and call program detection.

Before describing how the network 10 of FIG. 1 is utilized to set up cross-context connections, the structure of the linking database is described in greater detail. An entry in the linking database for a typical individual subscriber is illustrated in FIG. 2. The entry is accessed by a unique personal identification number of the subscriber. The personal identification number of a subscriber may comprise a string of numbers or other alphanumeric characters. The target context field includes the various contexts for which someone might wish to obtain the address of the subscriber such as residence phone, residence fax, business phone, etc. The provider address field provides an address to a directory database which contains the address for each context. These directory databases can be accessed using the personal identification number of the subscriber.

Optionally, the linking database entry of FIG. 2 includes the key information field. This field will include the key for accessing a directory database which cannot be accessed using the personal identification number. In addition, the linking database entry may also include a target value field. This field can be used to provide actual addresses in particular contexts where a directory database is inaccessible or as a call processing expedient to avoid having to access a particular directory data. The linking database may also contain protocol information about various ones of the directory databases.

To show how the network 10 of FIG. 1 is utilized for cross-media and cross-context connections several examples are considered.

In the first example, subscriber A (see FIG. 1) wishes to call subscriber B's business phone 52 by specifying the number of subscriber B's residence phone 51. Starting from one of subscriber A's phones, such as phone 41 or 42, the subscriber A accesses the cross-context service by dialing a special telephone number. A call is established in the public switched telephone network 20 which terminates on the hunt group of lines 74, 75, 76. The call is answered by one of the voice synthesizers 84, 85, 86. The answering voice synthesizer prompts the subscriber to enter a query type, i.e. the target context, which in this case is a business phone. For example, the answering voice synthesizer may ask the subscriber A to: press "1" to reach a business phone, press "2" to reach a residence phone, press "3" to reach a cellular phone, press "4" to reach a business fax, press "5" for business voice mail, press "6" for electronic mail. Once the subscriber A makes the appropriate selection, the answering voice synthesizer prompts the subscriber A to enter a source data element which in this case is subscriber B's residence telephone number. In the manner described below, the network 10 utilizes the source data element (i.e. subscriber B's residence number) to obtain a target data element which in this case is subscriber B's business telephone number.

To obtain the target data element, the first step is for the directory controller 70, to send a query including the source data element to the service control point 60 to access the database. In accordance with the present invention, for all residential phone numbers, the LDB database includes the subscriber name and personal identification number. Thus, in response to subscriber B's residence number, the directory controller 70 obtains subscriber B's personal identification number.

The directory controller 70 then launches a second query. This second query is directed to the linking database in the service control point 60 and uses subscriber B's personal identification number to access the entry for subscriber B in the linking database. The linking database then returns to the directory controller 70 the address of a business directory database. Illustratively, this business directory database is maintained by the processing system 31 attached to the network 30. The directory controller then launches a third query to the appropriate business directory database via the network 30 and obtains the business telephone number of subscriber B. Generally, the appropriate business directory database is accessed by using the personal identification number of subscriber B as a key. Alternatively, other key information obtained from the linking database may be utilized to access the appropriate business directory database. (Illustratively, for a faster response the business telephone number for subscriber B could be contained in the target value field of the linking database entry for subscriber B).

Once the directory controller 70 obtains the desired address for the business phone of subscriber B, the call from subscriber A is automatically transferred to this address. In some embodiments of the inventions, the target address may be provided to subscriber A by the answering voice synthesizer.

Thus in the foregoing manner subscriber A is connected to the business telephone of subscriber B by specifying only subscriber B's residence phone number.

Now consider an example wherein subscriber A wishes to reach subscriber B's cellular phone 53 by specifying the number of subscriber B's business phone 52.

In this case, subscriber A dials a special phone number and is connected via the network 20 to the directory controller 70. In response to prompting by a voice synthesizer, the subscriber A provides to the directory controller 70 the target context which in this case is a cellular phone and a source data element which in this case is the business phone number of subscriber B. The directory controller 70 then accesses the LDB database in the service control point 60 and obtains the address of the business associated with the business phone number. The directory controller 70 then accesses, for example, via the network 30, the directory database associated with this business and obtains the personal identification number of subscriber B. The directory controller uses the personal identification number of subscriber B to access the linking database to obtain the address of the directory database of subscriber B's cellular provider. The directory controller than accesses this directory database to obtain subscriber B's cellular telephone number and cause the network to connect subscriber A to subscriber B at subscriber B's cellular telephone.

The foregoing examples illustrate some important benefits provided by the linking database. First, there is a high level of security since each database can have its own access restrictions. In addition, there is a high level of privacy because the directory controller 70 can complete a call without revealing any addressing information. Thus, in the first example discussed above, it is not necessary to reveal to subscriber A the business phone number of subscriber B and in the second example, it is not necessary to reveal the cellular number of subscriber B to subscriber A. In addition, data about each individual is distributed among various organizations rather than being concentrated in one place so as to avoid problems in maintaining consistency of data.

In a further example, consider the case where a subscriber C working at the terminal 36 wishes to send an electronic mail message to a subscriber D at terminal 38 by specifying subscriber D's residence phone number. The address of subscriber D is detected as a phone number by the mail server 34 which transmits this phone number via the network 30 to the directory controller 70. The directory controller 70 utilizes this residence phone number as the source data element. The directory controller 70 accesses the LDB database at the service control point 60 of the public switched telephone network 20 and using subscriber D's residence phone number obtains the personal identification of subscriber B. The directory controller than accesses the linking database and obtains the address of the directory database which contains subscriber D's electronic mail address. This directory database is then accessed to obtain the electronic mail address of subscriber D and a communication path between subscriber C and subscriber D is established using network 30.

Finally, the above-described embodiments of the invention are intended to be illustrative only. Numerous alternative embodiments may be devised by those skilled in the art without departing from the spirit and scope of the following claims.

We claim:

1. A communications network for providing cross-context connections between subscribers comprising processing means for maintaining a first database including one entry per network subscriber, each such entry being accessible in response to a personal identification number of the corresponding subscriber and comprising a plurality of pointers to directory databases which contain addresses for the corresponding subscriber in different contexts, a directory controller located in said network and including means for communicating with the directory databases to obtain said personal identification number of a said subscriber from said databases, first transmission means for transmitting a first address of a second subscriber to said directory controller from a first subscriber so that said directory controller can obtain a personal identification number of said second subscriber from a directory database, second transmission means for enabling said directory controller to communicate with said processing means to access said first database in response to said personal identification number to obtain from said first database information relating to a different address of said second subscriber, and means for establishing a connection between said first subscriber and said second subscriber at said different address.

2. The network of claim 1 wherein said network is formed at least in part by a public switched telephone network.

3. The network of claim 2 wherein said processing means is located at a service control point of said public switched telephone network.

4. A network for providing cross-context connections between subscribers comprising:
- first processing means for maintaining a plurality of directory databases including mappings between individual names, addresses and personal identification numbers of subscribers in a plurality of telecommunications contexts,
- second processing means for maintaining a linking database comprising one entry for each of a plurality of network subscribers, each entry being accessible in response to a personal identification number of the corresponding subscriber and containing a plurality of pointers to individual ones of said directory databases,
- a directory controller for accessing said first and second processing means,
- means for transmitting a first address of a second subscriber from a first subscriber to said directory controller,
- means for transmitting a personal identification number of said second subscriber to said directory controller from one of said directory databases in response to said first address of said second subscriber, and
- means for transmitting said personal identification number to said second processing means to obtain information related to a second address of said second subscriber.

5. The network of claim 4 wherein said network includes means for establishing a switched connection between said first subscriber and said second subscriber at said second address.

6. The network of claim 4 wherein said directory controller comprises a host computer.

7. The network of claim 4 wherein said network is formed at least in part by the public switched telephone network.

8. The network of claim 4 wherein said linking database is located at a service control point of said public switched telephone network.

9. A method for enabling a first subscriber who knows a first address of a second subscriber to establish a communication path via a communications network with the second subscriber at a second address unknown to the first subscriber, said method comprising the steps of:
- establishing a communication path through said network between said first subscriber and a directory controller connected to said network,
- transmitting via said communication path in said network said first known address of said second subscriber to said directory controller,
- under the control of said directory controller, utilizing said first address of said second subscriber to gain access to a directory database containing a personal identification number for said second subscriber, and
- under the control of said directory controller, utilizing said personal identification number of said second subscriber to communicate with a processing system attached to said network for accessing a linking database to obtain the second address of the second subscriber, said linking database comprising at least one entry per network subscriber, each such entry being accessible by a personal identification number of the corresponding subscriber and comprising one or more pointers to other databases which contain addresses for the corresponding subscriber in different contexts.

10. The method of claim 9 wherein said network is a public switched telephone network.

11. The method of claim 10 wherein said processing system, in which said linking database is maintained, is located at a service control point of said public switched telephone network.

12. The method of claim 11 wherein said service control point comprises a multiprocessor system.

13. The method of claim 11 wherein said directory controller comprises a host computer which communicates with said service control point.

14. The method of claim 9 wherein said step of accessing a directory database to obtain the personal identification number of said second subscriber comprises utilizing said first address of said second subscriber to access a first directory database to obtain the identification of a second directory database and which second directory database contains said personal identification number and accessing said second directory database to obtain said personal identification number.

15. The method of claim 9 wherein said step of accessing said linking database to obtain said second address comprises the step of obtaining said second address directly from said linking database.

16. The method of claim 9 wherein said step of accessing said linking database to obtain said second address comprises accessing said linking database to obtain the identification of a further database containing said second address and accessing said further database.

17. The method of claim 9 wherein said method further comprises the step of forming a communication path through said network between said first subscriber and the second address of said second subscriber.

18. The method of claim 9 wherein the first address of the second subscriber is a residence phone number and the second address of the second subscriber is a business phone number.

19. The method of claim 9 wherein the first address of the second subscriber is a business phone number and the second address of the second subscriber is a cellular phone number.

20. The method of claim 9 wherein said method further comprises the step of communicating said second address of said second subscriber to said first subscriber.

* * * * *